Nov. 17, 1959          H. A. BOMKE          2,913,665
OPTICAL MICROWAVE POWER MEASURING SYSTEM
Filed March 1, 1956                    2 Sheets-Sheet 1
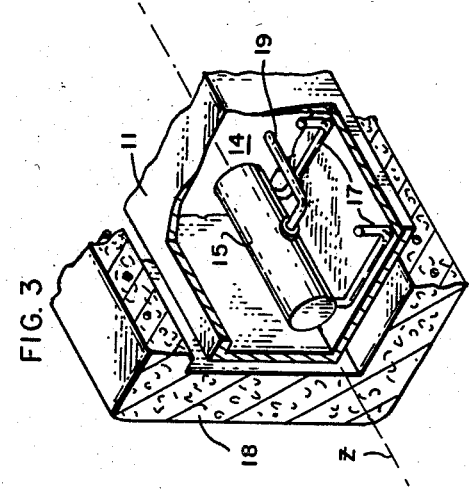
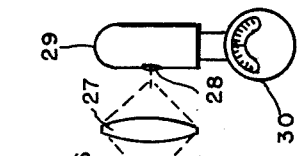
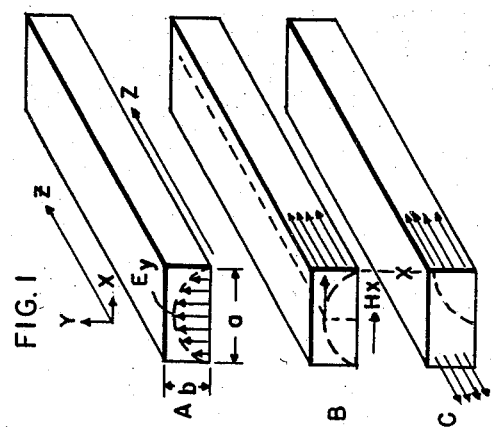
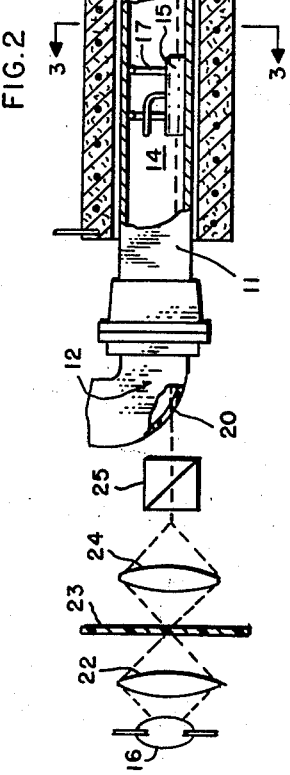
INVENTOR.
HANS A. BOMKE
BY *Frederick M. Strader*
ATTORNEY Nov. 17, 1959    H. A. BOMKE    2,913,665
OPTICAL MICROWAVE POWER MEASURING SYSTEM
Filed March 1, 1956    2 Sheets-Sheet 2
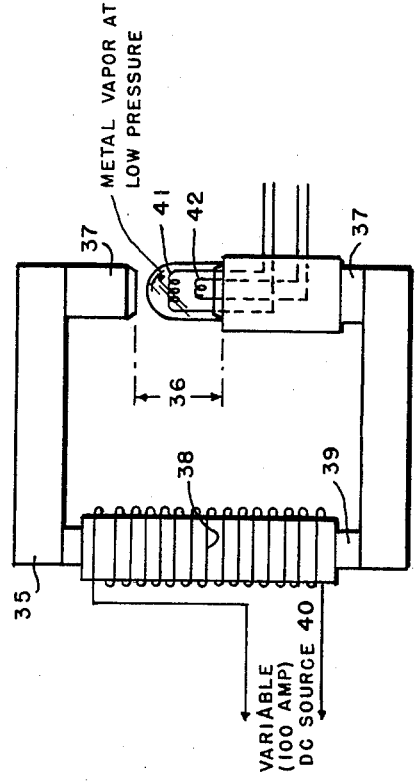
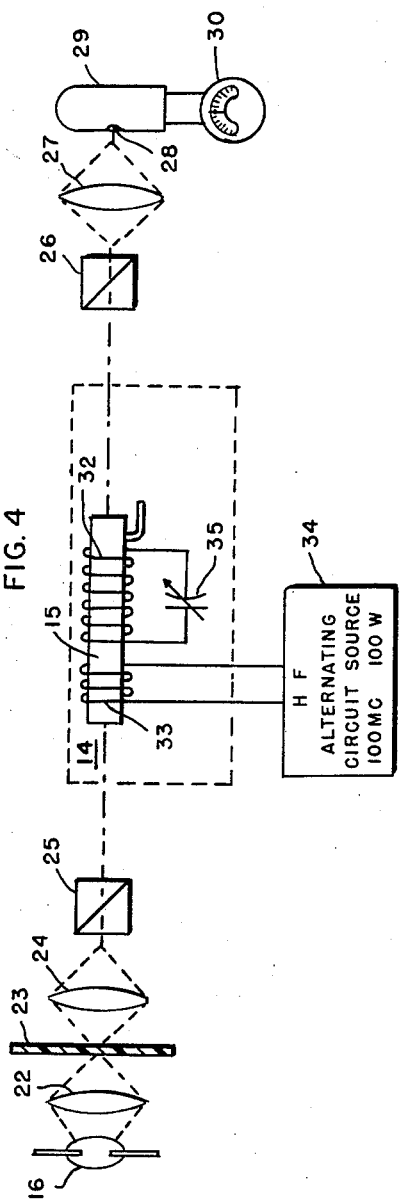
INVENTOR.
HANS A. BOMKE
ATTORNEY

United States Patent Office 2,913,665
Patented Nov. 17, 1959

2,913,665

OPTICAL MICROWAVE POWER MEASURING SYSTEM

Hans A. Bomke, Sea Girt, N.J., assignor to the United States of America as represented by the Secretary of the Army Application March 1, 1956, Serial No. 568,942

7 Claims. (Cl. 324—95)

(Granted under Title 35, U.S. Code (1952), sec. 266)

The invention described herein may be manufactured and used by or for the Government for governmental purposes, without the payment of any royalty thereon.

The invention relates to measuring systems and apparatus and particularly to systems and apparatus for measuring electromagnetic wave energy, such as the power of continuous or pulsed microwaves or the strength of ultra-high frequency alternating or direct current magnetic fields.

Prior art methods for measuring the power of ultra-high frequency electromagnetic wave energy transmitted over a waveguide or other wave transmission medium are usually of the absorption-thermal type, involving diversion of a portion of the wave energy to be measured from the wave transmission medium, the absorption of the diverted energy in an element associated with the measuring device so that it is converted into heat therein, and the measurement in a suitable metering device calibrated in power units of the resultant rise in temperature of the absorption element, which, of course, is proportional to the amount of absorbed energy and thus to the power in the diverted wave energy. These indirect prior art methods have the following disadvantages: (a) the diversion of power from the main transmission medium reduces the amount of power transmitted over the main transmission medium to the load and may introduce disturbing effects in that medium; (b) because of the more or less pronounced thermal inertia of the energy absorbing elements, the temperature changes in these elements will not follow very rapid changes in power of the applied wave energy, and thus the measurement of peak power, at least that in short pulses, of the waves transmitted over the main wave transmission medium, will be inaccurate; and (c) the required precise calibration of the measuring systems and apparatus prior to each measurement is time-consuming and laborious. These limitations in the prior art methods and apparatus make them unreliable, inaccurate and unduly expensive.

A general object of the invention is to devise a method of and apparatus for measuring the power of high-frequency electromagnetic wave energy, which are not subject to such limitations.

A related object is to measure accurately the power in microwave energy transmitted over a waveguide or other wave transmission medium with minimum absorption of useful energy from the medium.

Another general object is to provide new and improved techniques and equipment for direct measurement of high-frequency electromagnetic wave energy, particularly that contained in short time intervals (short pulses) in contra-distinction to that contained in recurrent pulses determined over relatively longer time intervals.

Another and a more specific object is to produce with relatively simple and economical measuring equipment a continuous accurate measurement of the power in a continuous or pulsed microwave.

Another object is to measure accurately the strength of alternating and direct current magnetic fields.

A systematic and theoretical study by the applicant of the known physical effects of microwave energy and of known transmission media therefor has indicated that a measurement of the power of such wave energy could be made more accurately and economically by optical means and particularly by optical means utilizing the known Faraday optical effect. This effect, discovered by Michael Faraday in 1845, is the rotation of the plane of polarization of a linear (plane) polarized light beam produced when it is transmitted through a transparent substance subjected to a magnetic field the direction of which is longitudinal with respect to the direction of propagation of the light beam. The amount of rotation is usually given by the formula $$\theta = VHL \qquad (1)$$

where $\theta$ is the angle of rotation, H is the magnetic field strength, L is the path length of the light beam in the transparent substance, and V is a constant, commonly referred to as the "Verdet constant," which depends on the particular material used in the transparent substance and also on the wavelength of the light beam.

Two different types of optical Faraday effect are known, the paramagnetic and the diamagnetic effect. The paramagnetic effect, which is caused by partial alignment of the natural magnetic dipoles of the paramagnetic atoms in the Faraday substance, is not particularly suitable for use in power measuring devices in the microwave frequency range, because at frequencies of more than 100 megacycles per second the inertia of the atomic dipoles, as well as their mutual friction, is such as to prevent them from following rapid changes in intensity of the applied magnetic field. The known magneto-optical Zeeman effect, which consists in a splitting of single spectral lines into triplets and doublets under the action of a magnetic field, and the known electro-optical Kerr effect, canot be used for power measurement at such high frequencies for similar reasons. However, the diamagnetic Faraday effect, which is a true dispersion effect caused by the Zeeman splitting of the spectral lines of a diamagnetic material under the action of a magnetic field, is free from this inertia and also is not restricted by any frequency limit so that it should, at least theoretically, follow each change in the applied magnetic field intensity even at the higher frequencies in the microwave region. The physical reason for this is that the diamagnetic Faraday effect belongs to the group of optical dispersion effects in which the quantization time does not influence the effect, as can be shown by modern quantum-mechanical theory. Therefore, the diamagnetic Faraday effect, which is proportional to the magnetic field strength, in these respects appears to be particularly suitable for utilization in connection with systems for measuring power in the microwave frequency region.

Most transparent substances display only a small optical Faraday effect. In general, such substances require magnetic field strengths of the order of some thousand gauss to produce any appreciable Faraday optical effect. For example, the angle of rotation of a plane polarized light beam in a known transparent substance having a light path length of 10 centimeters and subjected to a magnetic field of almost 10,000 gauss is of the order of 1 to 5 degrees only. Such small effects are practically useless. In practice, even under the most favorable conditions, the magnetic field strength apparent at microwave frequencies is only of the order of some few gauss. For this reason the Faraday optical effect has not been previously considered suitable for use in equipment for measuring microwave energy.

Since the magnitude of the Faraday optical effect is dependent upon the refraction index of the Faraday substance with wavelength, in addition to the magnetic field strength and length of the light path in this field, it can be expected that diamagnetic Faraday substances which display a so-called anomalous dispersion would have a larger Faraday effect. Now, it is well known that certain monatomic gases irradiated with their own optical resonance radiation have a high anomalous dispersion. However, the gas has to be under a very low pressure, for otherwise the effect of the anomalous dispersion is very much decreased by the radiation damping produced by the collision of the gas atoms with each other. Such gases which have a resonance absorption in an easily accessible spectral region are the vapors of mercury and cesium, and of the alkaline metals, sodium, potassium, etc. The applicant by experimentation with Faraday cells containing such gases has found that by proper adjustment of the experimental conditions, the sensitivity of the Faraday effect within the spectral lines in such cells can be increased by a factor of more than a million.

In a broad sense, applicant's invention involves the application of the Faraday optical effect to provide accurate measurement of electromagnetic wave energy, particularly ultra-high frequency electromagnetic wave energy. In a narrower sense, the invention resides in an improvement in Faraday cells, and in the relative characteristics of such cells and the associated light sources which will make such devices in combination provide a greatly increased sensitivity of the Faraday diamagnetic effect and thus particularly suitable for use in systems for accurately measuring the strength of high-frequency alternating or direct current magnetic fields or the power in continuous or pulsed microwaves. More specifically, these improvements reside in the use in such a measuring system of an improved Faraday cell containing a diamagnetic substance, adapted for providing an appreciable and easily measurable rotation of a suitable linear polarized light beam transmitted therethrough, in response to the application to that cell in the proper direction of an ultra-high frequency alternating or direct current magnetic field of an intensity ranging from a very high value down to a fraction of a gauss. This Faraday cell may consist, for example, of a tube of quartz, glass or other transparent material, of an optimum length, containing at a sufficiently low pressure, in the order of $10^{-3}$ millimeters, a gaseous material, for example, mercury vapor, cesium vapor or the vapor of an alkaline metal, such as sodium, having a strong sharp resonance absorption line at a wavelength within an easily accessible spectral region. A suitable light source is provided by a lamp containing the same gaseous material at approximately the same low pressure, or one adapted for emitting most of its light as a single, sharp spectral line at approximately the same wavelength as that of the absorption line of the gaseous material in the Faraday cell.

In one embodiment of the measuring system of the invention employing such a Faraday cell and associated light source, the light from the latter is collimated into a parallel beam or bundle of light rays of a desired cross-dimension and is linearly polarized by suitable means before it is transmitted through the transparent container containing the diamagnetic Faraday substance forming the Faraday cell; and that container is suitably mounted within a hollow pipe rectangular waveguide transmitting the utlra-high frequency electromagnetic wave energy, the power of which is to be measured, so as to allow application of the magnetic field produced within the waveguide to the Faraday cell in the proper direction, and to enable transmission of the linearly polarized light beam in a straight line through the container and waveguide, to wave analyzing and measuring equipment for determining the amount of rotation produced in the beam and converting it into proportional electrical units.

The following calculations indicate that a Faraday effect sufficiently sensitive for power measurements in the microwave range can be obtained by the use of a Faraday cell in accordance with the invention, for example, one containing the vapor of either mercury or sodium under a sufficiently low pressure, approximately $2 \times 10^{-3}$ mm. To show this, the magnetic field intensity H (in gauss) produced by microwave energy of P watts propagated inside a hollow waveguide will be calculated first. In the case of a transverse magnetic wave mode, only one magnetic component of the field strength transverse to the propagation direction $z$, either in the $x$ or in the $y$ direction, exists, while in the case of the transverse electric wave mode two magnetic field components exist, a transverse one in either the $x$ or in the $y$ direction, and a longitudinal one in the $z$ direction. Since the case of the transverse magnetic field component is not so favorable (although experiments which have been made by applicant indicates that it can be used for the purposes of the invention), the case of the longitudinal component only will be considered here. A particular example, which is of great practical importance and which has been actually built in the laboratory, namely a $TE_{10}$ mode in a rectangular hollow waveguide with a side ratio of 2:1, will be discussed.

As is well known, a $TE_{10}$ mode has only three field components which, using Cartesian coordinates ($x, y, z$) where $z$ is the direction of propagation, are an electrical component $E_y$ which varies along the $x$-direction of the waveguide and is directed along the $y$-direction; a magnetic component $H_x$, which varies with the $y$-position and is directed in the $x$-direction; and a longitudinal $H_z$ component, which varies with the $x$-position. Those three field components in the $TE_{10}$ case are given by the known equations $$H_x = \frac{Bj\alpha\pi}{k^2 a} \sin\left(\frac{\pi x}{a}\right) \sin \omega t \quad (2)$$

$$H_z = B \cos\left(\frac{\pi x}{a}\right) \sin \omega t \quad (3)$$

$$E_y = \frac{-Bj\mu\mu_0\omega}{k^2}\left(\frac{\pi}{a}\right) \sin\left(\frac{\pi k^2}{a}\right) \sin \omega t \quad (4)$$

which can be easily derived from the well known Maxwell equations using the boundary conditions of the waveguide. In these equations B is the amplitude factor, $\alpha$ is the propagation constant, and $k$ is an abbreviation for $$k = \sqrt{\left(\frac{m\pi}{a}\right)^2 - \left(\frac{n\pi}{b}\right)^2} \quad (5)$$

where $a$ and $b$ are the cross-sectional dimensions of the rectangular waveguide sides parallel to the $x$ and $y$ directions, respectively, and $m$ and $n$ are the mode numbers, which for the $TE_{10}$ mode would be $m=1$ and $n=0$, so that the expression for $k$ in this case simplifies to $$k = \frac{\pi}{a} \quad (6)$$

The propagation constant, $\alpha$ is equal to $\omega/V$, where $\omega$ is the angular frequency of the microwave used and V is the phase velocity of the microwave in the waveguide. Since the phase velocity is given by the relation $$V = \frac{\omega}{\sqrt{\epsilon\epsilon_0\mu\mu_0\omega^2 - \left(\frac{m\pi}{a}\right)^2 - \left(\frac{n\pi}{b}\right)^2}} \quad (7)$$

where $\epsilon$ and $\mu$ are the relative dielectric constant and the relative permeability, respectively, inside the waveguide, and $\epsilon_0$ and $\mu_0$ have the values $$\frac{1}{4\pi(9)(10^{11})}$$

and $4\pi$ $(10^{-9})$, respectively, in a unit system using ampere, volt, cm., g. and sec. In our example, where $m=1$ and $n=0$, the expression for the propagation constants becomes $$\alpha = \sqrt{\epsilon\epsilon_0\mu\mu_0\omega^2 - k^2} \quad (8)$$

Inserting the value for $k$ in (6) above into the expressions for $H_x$ and $E_y$ in Equations 2 and 4, respectively, we obtain $$H_x = \frac{Bj\alpha}{\pi} \sin\left(\frac{\pi x}{a}\right) \quad (9)$$

$$E_y = \frac{-Bj\omega a}{\pi} \sin\left(\frac{\pi x}{a}\right) \quad (10)$$

in which the time dependent $\sin \omega t$-term has been omitted, since it will not be needed for the following calculations, if, as is always done in power considerations, the quadratic time average values are used for the field strengths. The power P in watts going through the cross-section of the waveguide, is related to the transverse field strengths $E_y$ and $H_x$ by the well known Poynting vector relation:

$$P = \int_0^a \int_0^b E_y H_x^* dx dy \quad (11)$$

where the asterisk * at the $H_x$ stands for the conjugate complex value of $H_x$. After inserting the expressions for $E_y$ and $H_x$ in Equations 9 and 10 above and integrating, Equation 11 becomes $$P = B^2 \mu \mu_0 \omega \alpha \left(\frac{a}{\pi}\right)^2 \left(\frac{ba}{2}\right) = \frac{B^2 \mu \mu_0 \omega \alpha^3 b}{2\pi^2} \quad (12)$$

and if, as was mentioned before in connection with the reason for omitting the time dependent term, the quadratic time average values for the field strengths are introduced, Equation 12 becomes $$P = \frac{B^2 \mu \mu_0 \omega \alpha^3 b}{4\pi^2} \quad (13)$$

From Equation 13, the amplitude value B is obtained as a function of the applied power P:

$$B = \frac{2\pi}{a} \sqrt{\frac{P}{\mu \mu_0 \omega \alpha ab}} \quad (14)$$

and by inserting this B factor into the equations for $H_x$ and $H_y$ in (9) and (10) above in turn, the magnetic field components at any desired position in the waveguide may be expressed as a function of the power.

In a practical example, the selected values are $a = 7$ cm., $b = 3.5$ cm., and a quite arbitrary frequency of 2800 mc. is used, so that the angular frequency $$\omega = 2\pi V = 1.75(10^{10})$$

It follows that $k$ has a numerical value of 0.45, and the propagation constant $\alpha$ a value of 0.37. Then $$B = 2(10^{-2})\sqrt{P} \text{ A./cm.} = 2.5 \ (10^2)\sqrt{P} \text{ gauss} \quad (15)$$

so that the quadratic time average of $H_z$ immediately at the well surface $b$ of the waveguide has a value of $$H_z = 2.5 \ (10^{-2})\sqrt{P} \text{ gauss} \quad (16)$$

Since a certain allowance has to be made for the lateral thickness of the Faraday tube, the light beam going through the Faraday tube cannot pass along the waveguide wall too closely. A distance of 1 centimeter from one side wall $b$ has been found by experiments to be a very convenient and technically easily manageable distance. For this distance from the wall, we find under the above assumptions using the expression $$H_z(X) = 2.5(10^{-2})\sqrt{P} \cos\left(\frac{\pi x}{a}\right) \quad (17)$$

that the field strength $H_z$ (1 cm.) is $2.25(10^{-2}) \sqrt{P}$. We can therefore in a practical experiment expect to have the following available $H_z$ (1 cm.) values:

$$H_z \ (1 \text{ cm.}) = 0.02 \text{ gauss for } P = 1 \text{ watt} \quad (18)$$
$$= 2 \text{ gauss for } P = 10 \text{ kw.}$$
$$= 4 \text{ gauss for } P = 40 \text{ kw.}$$

Now, the light beam travels through the waveguide with the light speed of $c = 3(10^{10})$ cm. sec., while the phase velocity, V, with which the periodic changes of the magnetic field strength component $H_z$ are propagated through the waveguide, is given by the equation $$V = \frac{\omega}{\sqrt{\epsilon_0 \mu_0 \omega^2 - \left(\frac{\pi}{a}\right)^2}} \quad (19)$$

In our practical example, this phase velocity is $4.75(10^{10})$ cm./sec. Therefore, the magnetic field $H_z$ is moving with respect to the traveling light beam with a relative speed $V - c = 1.75(10^{10})$ cm./sec., so that after a certain time $$t = \frac{\Lambda}{2(V-c)}$$

where $\Lambda$ is the phase wavelength within the waveguide, the considered light beam element, which was originally under the influence of a positively directed field $H_z$, is now under the action of an oppositely directed field of the same value. The direction of rotation of the polarization plane of the light beam in this part of the light path, therefore, will be opposite to that which it had when it first entered the light path. In other words, there exists a certain optimum length for the Faraday cell, when mounted in a waveguide system in the direction of the propagation axis of the waveguide, for which the obtainable rotation of the polarization plane of the light beam is a maximum. If the Faraday tube is longer than this optimum length, the obtainable rotation decreases until at a Faraday call length of double the optimum length, the overall rotation becomes zero. At a cell length three times the optimum length, the rotation is again at a maximum, decreases again to zero at four times the optimum length, and so on, periodically. It is, therefore, ordinarily of no advantage to have a Faraday cell in the waveguide which is longer than this optimum length, which can be expressed as $$l_{\text{optimum}} = \frac{\Lambda c}{2(V-c)} \quad (20)$$

where $\Lambda$ = wavelength inside the waveguide =

$$\frac{V}{v}$$

where $v$ is the microwave frequency. In our chosen numerical example, $l_{\text{optimum}}$ would be equal to 14 cm.

This limitation on the Faraday cell length, if desired, can be circumvented inserting optical $\lambda/2$ plates (for example, thin mica sheets of this thickness) at intervals separated by a distance of $l_{\text{optimum}}$ into the light path. This would provide exactly the right phase shift at all times, so that in this case the Faraday tube could be made of any desired length and the amount of rotation would always add along the light path.

Some of the structural and configurational features of the Faraday cell mounted in a hollow waveguide used in a measuring system embodying the invention will now be described in conjunction with the several figures of the accompanying drawings. Although these features are described as applied to a rectangular waveguide in a specific mode, the general considerations in this description apply to all types of hollow waveguides and to other modes than the $TE_{10}$ mode which was selected for illustration since it represents a very important practical application of applicant's invention.

In the drawings:

Figs. 1-A, B and C are explanatory diagrams showing the distribution of the electric and magnetic fields of the $TE_{10}$ mode in a rectangular hollow waveguide;

Fig. 2 is a top plan view, partly in section, of one practical embodiment of the measuring system in accordance with the invention, which was constructed and used successfully to measure accurately the magnetic field strength within a hollow, rectangular waveguide transmitting microwave electromagnetic wave energy; and Fig. 3 is an enlarged perspective sectional view of a portion of the measuring system of the invention shown in Fig. 2 taken along the lines 3—3 of that figure, and shown partly broken away to illustrate more clearly structural details of the Faraday cell of the invention;

Fig. 4 shows schematically an alternative arrangement for applying a high frequency magnetic field to a Faraday cell in the measuring system of the invention; and Fig. 5 shows an elevation view of one arrangement for applying a D.-C. magnetic field to the light source in the measuring system of the invention, to compensate for a frequency modulation effect produced in the Faraday cell at very high frequencies.

In order to visualize better the operation of the measuring system of the invention in the measurement of the power in microwave energy transmitted over a rectangular waveguide in the dominant $TE_{10}$ mode, it may be helpful to consider first the fields set up in the guide referred to in the above mathematical discussion and illustrated diagrammatically in Fig. 1 of the drawing. These fields include an electric field $E_y$ which is directed in the vertical ($y$) direction and varies along the ($x$) direction of the waveguide. As indicated in Fig. 1(A) by the varying lengths of the vertical arrows designated $E_y$, this field has a maximum value near the center of the guide and tapers off on either side towards the sidewalls $b$. The magnetic field has a standing component, $H_x$, in the $x$ direction, at right angles to the electric field $E_y$, which varies with the $y$ position, as illustrated in Fig. 1(B); and a traveling wave component, $H_z$, in the longitudinal direction $z$ along the guide, which varies with the $x$ position, having its maximum values at points along the sidewalls $b$ of the waveguide and tapering off at points away from these sidewalls, as indicated by the dotted curve in Fig. 1(C). Both the standing wave and traveling wave components of the magnetic field are proportional to the square root of the microwave power propagated inside the waveguide. However, the proportionality constant of the standing wave component is of an order of magnitude less than that of the traveling wave component of the magnetic field. For example, for the cross-sectional dimensions 3.5 cm. x 7 cm. of the rectangular waveguide used in the embodiment of the measuring system shown in Fig. 2 which was constructed and tested, the values of the traveling wave component and the standing wave component of the magnetic field may be computed from the above formulae to be $$H_z = H_{trav} = 1.6(10^{-2})\sqrt{P} \text{ gauss} \quad (21)$$

and $$H_x = H_{stand} = 2.5(10^{-3})\sqrt{P} \text{ gauss} \quad (22)$$

respectively, where P is the power of the microwave energy in watts. In both of these cases, the magnetic field has a strength lower than 1000 gauss, which is the minimum field strength required to produce appreciable amounts of rotation of the light beam in the Faraday devices of the prior art.

Since, as shown above, the traveling wave component of the magnetic field is stronger than the standing wave component of that field, in the preferred embodiment of the measuring system in accordance with the invention illustrated in Fig. 2 which was constructed, the tube of the Faraday cell was positioned within the waveguide so that it extended along the longitudinal dimension of the waveguide, i.e., in the $z$ direction, in order to provide greater sensitivity for the Faraday device. Also, since the traveling wave component has its maximum values at points along the sidewalls of the guide, in the constructed system the tube of the Faraday cell was positioned within the waveguide as close to one of the sidewalls as possible to further increase the sensitivity of the Faraday device.

The embodiment of the measuring system of the invention shown in plan view in Fig. 2 was constructed and used by the applicant to measure the strength of the magnetic field produced in a hollow pipe waveguide line 11 by microwave energy from a source (not shown) propagated longitudinally over that line. The waveguide line 11 is of rectangular cross section of cross dimensions 3.5 cm. by 7 cm. and includes two oppositely-disposed, right angle bends at points 12 and 13 spaced from each other along the length of the guide so as to provide an intermediate straight waveguide section between these points and two straight end sections at right angles thereto and respectively extending in opposite directions away from the intermediate section. This waveguide 11 is mounted by means (not shown) so that the two wider faces of the intermediate section of the waveguide extend longitudinally in parallel horizontal planes.

As shown in Fig. 2, a Faraday cell 14 is mounted within the interior of the intermediate, horizontal section of waveguide 11 at a point approximately equidistant from the two right angle bends at points 12 and 13. The cell 14, as shown in Fig. 2 and more clearly in Fig. 3, includes a completely enclosed, transparent, hollow container or tube 15, which as shown is cylindrical in shape but may have any other suitable shape, and is of an optimum length $l$ determined by the expression (20) above. The walls of the container 15 may be made from glass, quartz or other material which is transparent to the light rays from the associated light source 16, whether they are visible, infrared or ultraviolet rays. Alternatively, the tube 15 may be made from a non-transparent material except for windows in the tube end faces which would be made with any suitable material which is transparent to certain light rays, for example, to ultraviolet rays, to allow the passage of these light rays through the tube along its longitudinal axis. In addition to the container or tube 15, the Faraday cell 14 includes a suitable transparent diamagnetic Faraday substance within the container, having a resonant frequency characteristic such as to adapt it for displaying anomalous dispersion when irradiated with its own resonance radiation and thus to produce a large Faraday optical effect when subjected to a magnetic field in the proper direction (longitudinal) with respect to the propagation direction of the light wave from the light source 16 through the tube 15.

As previously pointed out in connection with the above mathematical discussion, to give maximum Faraday sensitivity, the tube 15 containing the diamagnetic Faraday substance is preferably positioned so that it extends in the longitudinal direction $z$ of the guide and so that it is as close as possible to one sidewall of the waveguide (say, 1 cm. away therefrom) in order to be in a position in which the magnetic field within the guide has maximum or near maximum strength. As shown in Fig. 3, the proper positioning of the Faraday cell within the waveguide may be accomplished by the use of suitably shaped glass projections, fins or legs 17 attached to the tube 15 and bearing against the bottom and other sidewall of the guide 11 as shown.

A suitable diamagnetic substance for use within the container or tube 15 to accomplish the purposes of the invention is a monatomic gas such as mercury vapor, cesium vapor or the vapor of one of the alkaline metals, sodium, potassium, etc., all of which have resonance absorption in an accessible spectral region and display high anomalous dispersion when irradiated with their own optical resonance radiation from a suitable light source, if the gas is at a sufficiently low pressure. Mercury vapor was found to be particularly convenient for such use since it has only one sharp, strong absorption line, namely, that at 2357 angstroms (A.), and its vapor pressure is of the right order, approximately a thousandth of a millimeter, at room temperature to give optimum anomalous dispersion in the neighborhood of this line, and therefore, a maximum Faraday effect.

Since the magnitude of the Faraday effect depends on the so-called oscillation strength (f) of the atom in the Faraday diamagnetic substance used, which in the case of the mercury atom is only .028, it was expected that by using sodium vapor instead of mercury vapor in the tube 15, the Faraday sensitivity could be further increased, since the sodium resonance radiation has about twenty to thirty times higher (f) value. The experiments made by applicant to be discussed later showed that this was the case, and that the sodium vapor was more effective at higher frequencies, say, 1000 megacycles per second and above, and enabled a greater Faraday sensitivity to be attained at these higher frequencies. However, the cell containing the sodium vapor had to be heated to about 250° C. in order to bring it up to the optimum low pressure. To provide for any necessary heating when gases other than mercury vapor are used in the tube 15, in the system of the invention as shown in Figs. 2 and 3, an electric heater or oven 18 closely surrounding the portion of the intermediate section of waveguide 11 in which the Faraday cell 14 is inserted is provided as shown.

To construct the Faraday cell 14 when a metal vapor, such as mercury or sodium vapor, is used for the diamagnetic Faraday material in the container 15, it is necessary only to evacuate the container, introduce a small portion of the vaporizable metal, say mercury or sodium, into the enclosure therein through the glass inlet tube 19, seal off this inlet tube and allow the metal to vaporize, with or without the application of heat thereto from the electric heater 18 as required, so as to fill the container with the metal vapor at the desired low pressure.

The purpose of the two right-angle bends at the points 12 and 13 in the rectangular waveguide 11 transmitting the microwave energy, the power of which is to be measured, is to provide means for enabling a linearly polarized light beam to enter into the interior of the intermediate section of that guide and to be propagated in a straight line through the horizontally positioned cylindrical Faraday cell 14 along the longitudinal axis thereof and to be passed out of the interior of that section to external wave analyzing and measuring equipment. This means is constituted by two circular holes 20 and 21 of suitable diameter drilled through the end walls of the intermediate section of the waveguide in the waveguide bends at points 12 and 13, respectively, directly opposite the respective ends of the horizontally positioned container 15. These holes may be covered with a suitable transparent material, for example, one made from calcium fluoride ($CaF_2$), to provide small plane end windows in the intermediate section of waveguide adapted to allow transmission therethrough of ultraviolet light rays from the light source 16. Quartz is preferably not used for these end windows or for the end windows in the container 15, because of its natural rotating power on polarized light transmitted through these windows.

The embodiment of the power measuring system utilizing the diamagnetic Faraday effect in accordance with the invention as illustrated in Fig. 2, includes the external high intensity light source 16 mounted at a point directly opposite the entrance window 20 in the bend at point 12 in the intermediate section of the rectangular waveguide 11. The light source 16 may be a gaseous discharge lamp, such as an arc lamp, containing the same gaseous material, for example, mercury or sodium vapor, and at substantially the same pressure as the gaseous material used in the container 15 of the Faraday cell 14, or one adapted for emitting most of its light at a single, sharp spectral line of the same wavelength as that of a resonance line of the Faraday diamagnetic substance used in that cell. For example, the light source 16 may comprise a mercury arc lamp adapted for emitting most of its light with high intensity at the ultraviolet mercury spectral line of 2537 angstroms (A.), in which case the diamagnetic substance in the container 15 of the Faraday cell 14 would be mercury vapor at an optimum low pressure not exceeding that of the mrecury vapor in the lamp 16, $2 \times 10^{-3}$ millimeters, which has a single, sharp absorption line at the same wavelength, 2537 A. Alternatively, the light source 16 might be a discharge lamp containing sodium vapor at a low pressure, adapted for emitting most of its light at a single, sharp spectral line of, say 5891 A., in which case the diamagnetic material in the container 15 of the Faraday cell 14 would be sodium vapor at the same low pressure or one not exceeding that of the sodium vapor in the lamp 16, which has a sharp absorption resonance line at the same wavelength, 5891 A., which would require that the Faraday cell 14 be heated by the electric heating unit 18 to about 250° C. to bring it up to the optimum pressure.

The embodiment of the invention shown in Fig. 2 also includes in line between the light source 16 and the entrance window 20 in the intermediate section of waveguide 11, other external equipment comprising in order, reading from left to right, a lens 22, a light filter 23, a lens 24 and a plane polarizer 25, such as a Nicol prism. The lens 22 is utilized for focusing the light rays from the lamp 16 on the filter 23. The filter 23, which may be, for example, an ultraviolet filter, adapted to transmit the applied light rays of a wavelength corresponding to that of a particular spectral line of the vaporizable metal used in the lamp 16, which, as stated above, would be 2537 A. for a mercury vapor lamp, and to absorb the applied light rays of all other wavelengths. The lens 24 is provided for collimating the light passed by the light filter 23 into a parallel beam or bundle of light rays of the desired cross-dimension determined by the selected cross-dimension of this lens. The resulting parallel beam or bundle of light is passed through a plane polarizer 25, such as a Nicol prism, the plane of polarization of which is held fixed at a desired angle by proper orientation of the prism in its mounting (not shown) capable of rotation. The polarizer 25 produces linear (plane) polarization of the light beam transmitted through it. The resulting linear polarized light beam is passed through the entrance window 20 into the interior of the intermediate straight section of the waveguide in which it is propagated in the longitudinal Z direction through the container 15 of the Faraday cell 14 and then out of the waveguide through the exit window 21 to the analyzer Nicol prism 26 the plane of polarization of which is oriented by proper orientation of the prism in its rotatable mounting (not shown) so that it is perpendicular to the fixed plane of polarization of the polarizer Nicol prism 25.

When no magnetic field is applied to the Faraday cell 14, connected between the two "crossed" Nicol prisms 25 and 26, the linear polarized light beam will be passed through it without change, that is, there will be no rotation produced in the beam, and no light will pass through the analyzer prism 26. However, when a continuous or pulsed microwave is being propagated over the waveguide line 11, an alternating magnetic field in the direction (longitudinal) of propagation of the light beam and varying in intensity in accordance with the variation in power of the microwave will be applied to the cell 14 causing a proportional amount of rotation in the plane of polarization of the light beam in transmission through the cell. Because of the magnetic field applied to the cell 14, the polarization plane of the light beam reaching the analyzer Nicol prism 26 no longer will be perpendicular with respect to that of the Nicol prism, but will be rotated by an angle proportional to the intensity of that field and thus to the power of the microwave energy transmitted over the waveguide line 11, and an amount of light which is proportional to that angle will be transmitted by that prism. The intensity J of the light passing through the second (analyzer) Nicol prism 26 is given by the equation $$J = J_0 \sin^2 \phi \qquad (21)$$

where $J_0$ is the intensity of the light entering the first (polarizer) Nicol prism 25 and $\phi$ is the Faraday rotation angle. Substituting the value of $\phi$ given in Equation 21, we obtain $$J = J_0 \text{ sine}^2 \; VHL \qquad (22)$$

In the system of the invention shown in Fig. 2, the light of varying intensity J passing through the analyzer Nicol prism 26 is focused by a lens 27 on a photoelectric cell, photocathode or other light sensitive element 28 of the photomultiplier tube 29 which converts the varying light intensities into proportional electrical units in well known manner. This photomultiplier tube, for example, may be of the type disclosed in United States Patent No. 2,005,059, issued June 18, 1935, to W. F. Tedham. The resulting electrical variations are supplied to the meter 30 which may be calibrated to continuously indicate directly in appropriate units the intensity of the magnetic field applied to the Faraday cell 14 or the power of microwave energy propagated over waveguide line 11 causing the rotation of the light beam.

Fig. 4 shows an alternative arrangement for applying a high frequency alternating magnetic field to be measured to the Faraday cell in a measuring system of the invention of the general type shown in Fig. 2, which was constructed and used experimentally by applicant. In this arrangement, a multiturn coil 32 of suitable inductance surrounding tube 15 of Faraday cell 14, containing mercury vapor at low pressure, is coupled through a coupling coil 33 also surrounding the tube 15, to a source 34 of 100 mc., 100 watt electromagnetic waves, and is tuned by the shunting variable condenser 35 to create and apply to the Faraday cell 14 a magnetic field of 8 gauss at a frequency of 100 mc.

Investigation by applicant of Faraday cells in accordance with the invention subjected to alternating magnetic fields of very high frequencies, for example, microwave frequencies of 1000 mc. and higher, has shown the existence of an additional effect at such frequencies, which, if not compensated for, might affect the accuracy of measurement. The dispersion curve of the Faraday sensitivity of such a cell when subjected to a D.-C. magnetic field has its maximum sensitivity near the frequency $f_0$ of the resonance absorption line of the metal vapor or other diamagnetic substance used in the cell, and falls off to nearly zero sensitivity outside the immediate neighborhood of this resonance frequency. However, as may be shown theoretically, and as has been verified experimentally by applicant, when an alternating magnetic field of such very high frequency is applied to the cell, the dispersion curve of the Faraday sensitivity shows a frequency modulation effect or splitting into two zones of intensity maxima, $f_0+n$ and $f_0-n$, respectively, where $n$ is the frequency of the applied alternating magnetic field. Since the frequency of the optical resonance radiation needed to illuminate the metal vapor Faraday cell is very high, say of the order of $10^{15}$ centimeters per second (c.p.s.), and has a natural line width of approximately $1/100$ of an angstrom (A.), which corresponds to approximately $4(10^8)$ c.p.s., this splitting of the Faraday sensitivity curve into two regions with sensitivity maxima near $f_0+n$ and $f_0-n$, which at frequencies under approximately $10^9$ c.p.s. for the magnetic field are well within the natural bandwidth of the light source, are without appreciable effect on the measurement of the Faraday effect. Therefore, in the above referred to experiment with the measuring system of the invention for measuring the power of electromagnetic wave energy of the frequency 100 megacycles, the Faraday effect attained was exactly the same as with an applied D.-C. magnetic field of the same field strength. As soon as the frequency splitting becomes greater than the natural line width of the light source used, the sensitive Faraday effect zones shift out of the region corresponding to the natural bandwidth of the light source and consequently the Faraday effect must drop to zero. From information at hand, it can be concluded that this will take place as soon as the frequency of the magnetic field becomes higher than approximately $4(10^8)$ c.p.s. corresponding to a wavelength of about 72 cm. For example, at a frequency of 2800 mc., the frequency splitting effect is about three times as large as the width of the spectral emission line of the material used in the light source. In other words, the maxima of the two Faraday sensitive regions, $f_0+n$ and $f_0-n$ in the Faraday cell are out of the spectral region where the associated light source emits radiation. Since there is no light in the Faraday sensitive regions, no Faraday effect is necessarily obtained. However, this situation can be changed so as to nullify the frequency modulation effect and bring back the full Faraday effect at the frequency 2800 mc. by a modification of the system of the invention which will now be described.

One easy method of accomplishing this nullification of the frequency modulation effect at very high frequencies is to apply a D.-C. magnetic field of sufficient strength to the light source in the system of the invention. This D.-C. magnetic field by the Zeeman effect will cause magnetic frequency splitting of the emission line of the material used in the light source, and by proper choice of the strength of the applied D.-C. field, can be made of the same order as the frequency splitting due to the frequency modulation of the Faraday effect in the Faraday cell so that the Faraday effect will be brought back to full strength. In the particular case of the use of sodium vapor in the Faraday cell and associated light source, the resonance line is actually double, and the Zeeman effect of the two sodium lines at 5891 A. and 5896 A., respectively, shows an anomalous behavior, these sodium lines splitting into more than two components. In this case where the magnetic field frequency is 3000 mc., a first intensity maximum of the Faraday effect appears when the Zeeman magnetic effect applied to the lamp is 1200 gauss, a second maximum appears at 1500 gauss and a third one at 2000 gauss. Thus, if the strength of the D.-C. magnetic field applied to the sodium lamp is gradually raised from zero to several thousand gauss, while a microwave magnetic field of 3000 mc. is acting on the Faraday cell, a strong Faraday effect will be obtained at approximately 1200, 1500 and 2000 gauss.

Fig. 5 shows one type of structure which could be associated with the light source 16, such as a sodium lamp, in the measuring system of Fig. 2 or 4 to provide the variable D.-C. magnetic field for compensating the frequency splitting of the Faraday effect at very high frequencies in the microwave frequency region. As shown, it comprises a magnet consisting of a magnetic framework 35 made from some magnetizable metal, such as iron, with an air gap 36 in one leg 37 and a magnetic coil 38 wound on the opposite solid leg 39. A variable source 40 of direct current, say, nominally, of 100 amperes, is connected across the terminals of the magnet coil 38. The light source 16, for example, a sodium lamp, in the measuring system of the invention shown in Fig. 2 or 4 would be mounted between the pole pieces of the magnet on either side of the air gap 36 in such manner as to be subjected to the D.-C. magnetic field produced by the magnet. The lamp 16 can only be operated (i.e., to provide current flow between the two filament electrodes 41 and 42) when the axis of the lamp is aligned with the direction of the magnetic field of the magnet.

A further advantage of the measuring systems in accordance with the invention as described above is that their accurate calibration can be made in simple manner by the use of known D.-C. magnetic fields instead of an alternating field produced by the microwave energy to be measured. This calibration has to be performed only once for the same equipment, whereas in the power and magnetic field measuring devices of the prior art the calibration procedures are much more complicated and usually have to be repeated at more or less frequent intervals with the same measuring equipment to insure accurate measurement. The calibration of the measuring systems of the invention consists merely in the application of direct current magnetic fields of different strengths to the Faraday cell in the direction (longitudinal) of propagation of the linearly polarized light beam thereto, noting a reading produced on the meter 30 representing the amount of angular rotation of the linearly polarized light beam produced by the D.-C. field of each presented value, and preparing a table of corresponding values which can be used to prepare a scale for the meter indicating the amount of rotation in terms of proportional magnetic field strength units. This calibration procedure would be accurate since the Faraday effect is independent of frequency and the Faraday cells of the invention operate in the same manner for a constant (direct current) magnetic field as they do for varying alternating fields. With a knowledge of the relationship between the power of microwave energy transmitted over a waveguide or other transmission medium and the magnetic field produced in this medium by the transmitted wave energy, a scale for the meter 30 which will indicate the amount of light beam rotation produced by a given magnetic field in terms of the proportional microwave power units producing these fields can be easily made.

*Experimental results.*—Some of the experiments which have been made in the laboratory under the supervision of the applicant utilizing apparatus in accordance with the invention will now be described.

The earlier experiments using a Faraday cell of 10 centimeters length filled with mercury vapor at the optimum pressure of approximately $2 \times 10^{-3}$ millimeters at room temperature and a D.-C. magnetic field showed that field strengths of one gauss could be detected and field strengths of the order of two gauss could be measured easily; and that with a similar Faraday cell containing sodium vapor at approximately the same pressure (obtained by heating the cell to a temperature of approximately 250° C.), D.-C. magnetic fields of strength of the order of .01 gauss or less could be measured. It appeared from these experiments that it would be quite feasible to detect and measure the power in microwave energy of the order down to approximately 30 to 40 kilowatts using mercury vapor-filled cells of optimum length and microwave power down to approximately one watt by using heated sodium vapor-filled Faraday cells.

Later experiment by applicant with a Faraday cell comprising a short mercury vapor-filled quartz tube, irradiated with linear polarized light of the ultraviolet mercury resonance line 2537 A., showed that in accordance with theoretical expectations, an alternating magnetic field of a frequency of 100 megacycles and of field strength of approximately 8 gauss gave a very good and accurately measurable Faraday effect which followed the variations in the strength of this high frequency field without delay and decrease in its magnitude at least up to this high frequency. The absolute Faraday sensitivity, as expected, was found to be the same for a D.-C. magnetic field and the 100 megacycle A.C. magnetic field.

Experiments with a sodium vapor-filled Faraday cell 11 centimeters in length heated to a temperature of approximately 250° C. to provide a pressure of approximately two thousandths of a millimeter, showed that magnetic field strengths of the order of 0.01 gauss or even less were detectable by it, indicating that such a cell could be used to detect and measure microwave magnetic field strengths down to that value and, therefore, also microwave powers (continuous wave or pulsed waves) down to approximately 0.5 watt.

Measurements of the earth's horizontal magnetic field, which in New Jersey has an intensity of about 0.02 gauss, were successfully performed under the supervision of the applicant, using equipment in accordance with the invention such as illustrated in Figs. 2 and 3 including a sodium vapor-filled Faraday cell heated to about 250° C., of 11 centimeters length, but eliminating the waveguide, mounted on a rotating turntable.

Since it is feasible to use a much longer light path than 11 centimeters, either by employing longer Faraday cells or a system of mirrors for providing multiple reflection of the light beam within the cell, a further improvement in the sensitivity of the Faraday diamagnetic optical effect should be possible, so that magnetic fields of less than a thousandth of a gauss will be measurable by this optical method.

Furthermore, the measuring system of the invention utilizing the Faraday diamagnetic optical effect has additional valuable practical applications. For examples, since the Faraday cell exposed to microwave fields acts as an inertialess light shutter, at double the frequency of the applied microwave field it could be used for precision measurement of the light velocity. In connection with an interfermetrically controlled mirror it also could be used as a means of automatic frequency control of high precision for microwave generators.

Various modifications of the arrangements illustrated and described which are within the spirit and scope of the invention will occur to persons skilled in the art.

What is claimed is:

1. A system for measuring the instantaneous power of ultrahigh frequency electromagnetic wave energy comprising a rectangular hollow waveguide line over which said wave energy is transmitted in the $TE_{10}$ mode, a Faraday cell consisting of a container of optimum length, which is transparent to light rays in a predetermined direction, mounted within the interior of said waveguide so that it is subjected to the magnetic field produced therein in said predetermined direction by the transmitted electromagnetic wave energy, and a transparent gaseous material within said container at a predetermined low pressure, having a strong, sharp resonance absorption line at a certain wavelength, and exhibiting at said optimum low pressure a high anomalous dispersion, means for producing and propagating through said cell in said predetermined direction a beam of light rays of said certain wavelength, polarizer means in the path of said beam for plane polarizing said light beam prior to its passage through said cell, analyzer means for analyzing said light beam after its passage through said cell, said analyzer means being oriented at right angles to the orientation of said polarizer means so that when the plane of polarization of said light beam remains unchanged in transmission through said cell in the absence of an applied magnetic field thereto said analyzer means will extinguish the analyzed light, and when the plane of polarization of said light beam in passage through said cell is rotated under control of the applied magnetic field, said analyzer will transmit an amount of light which is directly proportional to the angle of rotation of the polarization plane of the light beam produced in said cell, and means for continuously detecting and measuring the amount of light passing through said analyzer means to provide a measure of the proportional instantaneous intensities of said applied magnetic field and thus of the instantaneous power in said electromagnetic wave energy.

2. The system of claim 1, in which said waveguide line includes two spaced oppositely disposed angular bends therein and an intermediate straight section of rectangular waveguide between said bends, which is mounted so that its two wider faces extend longitudinally in parallel horizontal planes, the container of said cell is of cylindrical shape, means are provided for positioning the cylindrically shaped container within the interior of said intermediate waveguide section so that it extends longitudinally in said predetermined direction near one sidewall thereof where the magnetic field within the guide is of near maximum strength and said intermediate waveguide section includes two plane light-transparent windows in its ends walls at said bends, which are respectively located directly opposite the respective end walls of the cylindrically shaped container of said cell, such as to enable the plane polarized light beam to enter into the interior of said intermediate waveguide section through one of said windows, to pass in a straight line through said cell and to emerge from the interior of said intermediate waveguide section through the other of said windows.

3. A system for measuring the instantaneous power in microwave energy transmitted over a wave transmission medium, comprising a Faraday cell consisting of a container transparent to light in a predetermined direction and a gaseous material at an optimum low pressure within said container, having an atomic frequency resonance spectrum including a strong, sharp resonance absorption line at a predetermined wavelength, and exhibiting high anomalous dispersion in the near neighborhood of said line at said optimum low pressure, a light source including a discharge lamp containing a gaseous material having a single spectral emission line at said predetermined wavelength and means for collimating the light emitted from said lamp into a parallel beam of light rays of that wavelength, polarizer means for linear polarizing said light beam, means for propagating said light beam through said cell in said predetermined direction, means for applying a component of the alternating magnetic field produced at a given point in said medium by said microwave energy to said cell in a direction which is longitudinal with respect to the direction of propagation of the light beam therethrough, to cause angular rotation of the polarization plane of said beam, analyzer means oriented at right angles to the orientation of said polarizer means, for analyzing the light beam after it has passed through said cell, and transmitting an amount of light therefrom which is proportional to the amount of angular rotation produced in said beam by said cell, means for compensating for an undesired frequency modulation effect appearing in said cell and tending to affect the amount of angular rotation produced in said beam and thus the accuracy of measurement in the system, when the frequency of the alternating magnetic field applied to the cell exceeds a given high frequency in the microwave frequency range, consisting of means for applying a D.-C. magnetic field in the proper direction and magnitude to said lamp to control the spectral characteristics of the gaseous material therein so as to make the necessary compensating change in the wavelength at which said lamp emits most of its light, and means for continuously measuring the amount of light transmitted through said analyzer means to provide a measure of the instantaneous power of said microwave energy at said given point in said medium, which is proportional thereto.

4. The system of claim 3, in which said frequency modulation effect appearing in said cell when the frequency of the alternating magnetic field applied thereto exceeds said given high frequency, consists of a Zeeman splitting of the Faraday sensitive spectral region of the gaseous material therein into two zones having intensity maxima at the frequencies $f_0+n$ and $f_0-n$, respectively, where $f_0$ is the frequency of said resonance absorption line of the gaseous material in said cell and $n$ is the frequency of the alternating magnetic field applied to said cell, and said compensating means comprises means for applying a D.-C. magnetic field to said lamp in such direction and magnitude as to provide a Zeeman splitting of the spectral emission region of the gaseous material therein corresponding to that produced in the resonance spectrum of the gaseous material in said Faraday cell by the alternating magnetic field applied thereto.

5. A system for measuring accurately the instantaneous power of electromagnetic wave energy in the microwave frequency range transmitted over a transmission medium, comprising: a Faraday cell including a cylindrically-shaped quartz container approximately 16 centimeters in length and transparent to light in the direction of its longitudinal axis and a mercury vapor filling in said container at a pressure of approximately $10^{-3}$ millimeters, said vapor having an atomic resonance spectrum with only a single strong resonance absorption line, namely, that at 2537 Angstroms, and exhibiting high anomalous dispersion in the neighborhood of that line; a source for producing a beam of parallel light rays, said source including a high intensity mercury arc lamp which emits most of its light at the ultraviolet spectral line 2537 Angstroms, an ultraviolet filter for transmitting that wavelength and substantially absorbing all other wavelengths in the emitted light rays and a lens system for collimating the filtered light into a beam of parallel light rays; means for plane polarizing the resulting beam; means for propagating the polarized beam through said cell in said direction; means for applying to said cell a component of the magnetic field of the transmitted electromagnetic wave energy in said direction to produce an amount of rotation of the light beam propagated therethrough which is proportional to the intensity of the applied magnetic field and thus to the instantaneous power of said wave energy; analyzer means oriented at right angles with respect to said plane polarizing means, for analyzing the light beam after its passage through said cell; and means for continuously detecting and measuring the amount of light passing through said analyzer means to provide a measure of the instantaneous power in said electromagnetic wave energy transmitted over said medium which is proportional thereto.

6. A system for accurately measuring the instantaneous power of electromagnetic wave energy in the microwave frequency range transmitted over a transmission medium, comprising: a Faraday cell including a container which is transparent to light rays in a predetermined direction and a vapor of an alkaline metal within said container at an optimum low pressure in the order of about one-thousandth of a millimeter, said vapor having an atomic resonance absorption spectrum including a strong, sharp resonance absorption line at a particular wavelength within said range, and exhibiting at said low pressure a high anomalous dispersion in the neighborhood of said absorption line; a light source for producing a beam of parallel light rays, including a high intensity discharge lamp containing the same metal vapor at approximately the same low pressure as used in said Faraday cell, filtering means for selecting from the light rays emitted by said lamp those of said particular wavelength and substantially absorbing the rays of all other wavelengths and a lens system for collimating the light rays selected by said filtering means into a beam of parallel light rays of said particular wavelength; means for plane polarizing the resulting beam; means for propagating the polarized beam through said cell in said predetermined direction; means for applying a component of the magnetic field of said transmitted wave energy in said predetermined direction to said cell to produce an amount of rotation of the plane of polarization of the polarized light beam propagated therethrough which is proportional to the intensity of the applied magnetic field and thus to the instantaneous power in said wave energy; analyzer means oriented at right angles with respect to said plane polarizing means for analyzing the light beam after its passage through said cell; and means for continuously detecting and measuring the amount of light passing through said analyzer means to provide a measure of the instantaneous power in said transmitted electromagnetic wave energy.

7. A system for accurately measuring the instantaneous power of electromagnetic wave energy in the microwave frequency range transmitted over a wave transmission medium, comprising: a Faraday cell including a cylindrical glass tube of approximately 11 centimeters in length and transparent to light in a predetermined direction containing sodium vapor at an optimum pressure of approximately two-thousandths of a millimeter, said vapor having an atomic resonance absorption spectrum including a strong, sharp resonance absorption line at a particular wavelength in said range, and exhibiting at said optimum pressure a high anomalous dispersion in the neighborhood of said absorption line; a light source for producing a beam of parallel light rays at said particular wavelength including a high intensity discharge lamp containing sodium vapor at approximately the same low pressure as used in the Faraday cell, with an associated filter and lens system for producing from the light emitted from said lamp the beam of parallel light rays of the same wavelength as that of said strong resonant absorption line of the sodium vapor employed in the Faraday cell; means for plane polarizing the resulting light beam; means for propagating the polarized beam through said cell in said predetermined direction; means for applying to said cell a component of the magnetic field of the transmitted electromagnetic wave energy in said predetermined direction to produce an amount of rotation of the plane of polarization of the polarized light beam propagated therethrough proportional to the intensity of the applied magnetic field and thus to the instantaneous power in said wave energy; analyzer means oriented at right angles with respect to said plane polarizing means for analyzing the light beam after its passage through said cell; and means for continuously detecting and measuring the amount of light passing through said analyzer means to provide a measure of the instantaneous power in said transmitted electromagnetic wave energy proportional thereto.

References Cited in the file of this patent

FOREIGN PATENTS

| | | |
|---|---|---|
| 567,541 | France | Dec. 8, 1923 |
| 720,322 | France | Dec. 3, 1931 |
| 1,042,780 | France | Nov. 3, 1953 |

OTHER REFERENCES

Publication "Fundamentals of Optics," by Jenkins and White, 2nd edition, McGraw-Hill Book Co., New York, 1950, pages 597 through 600 relied on.